United States Patent Office 3,334,381
Patented Aug. 8, 1967

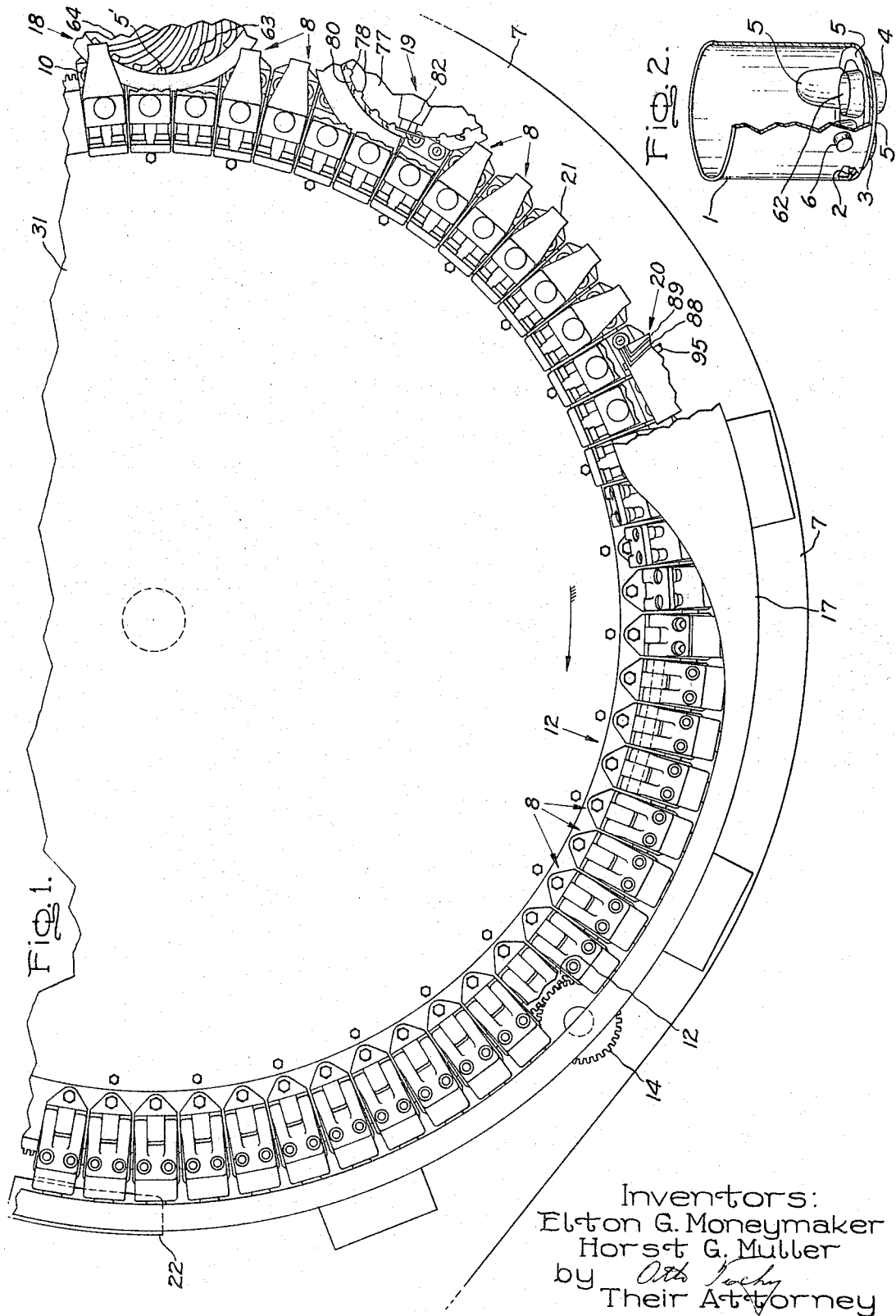

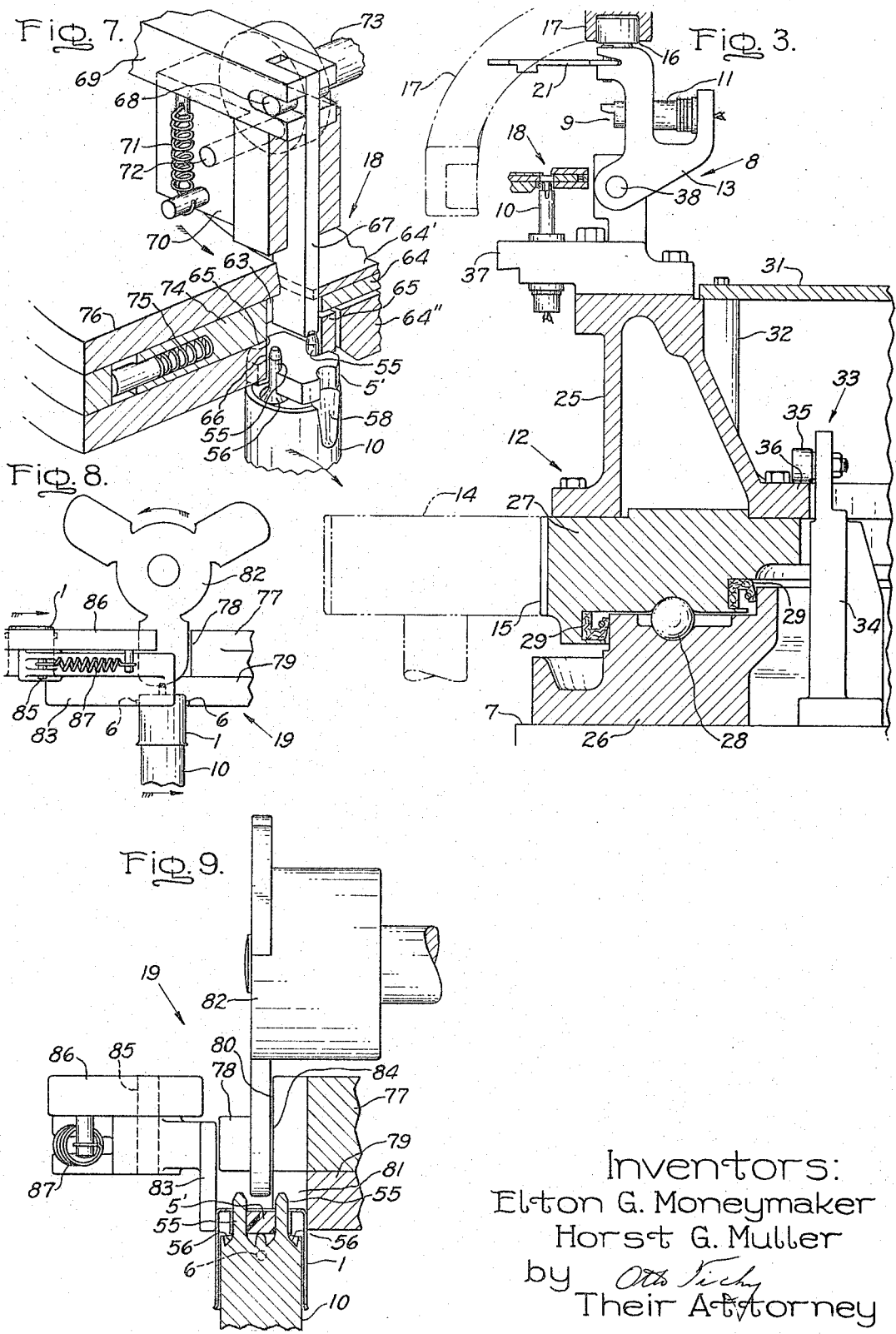

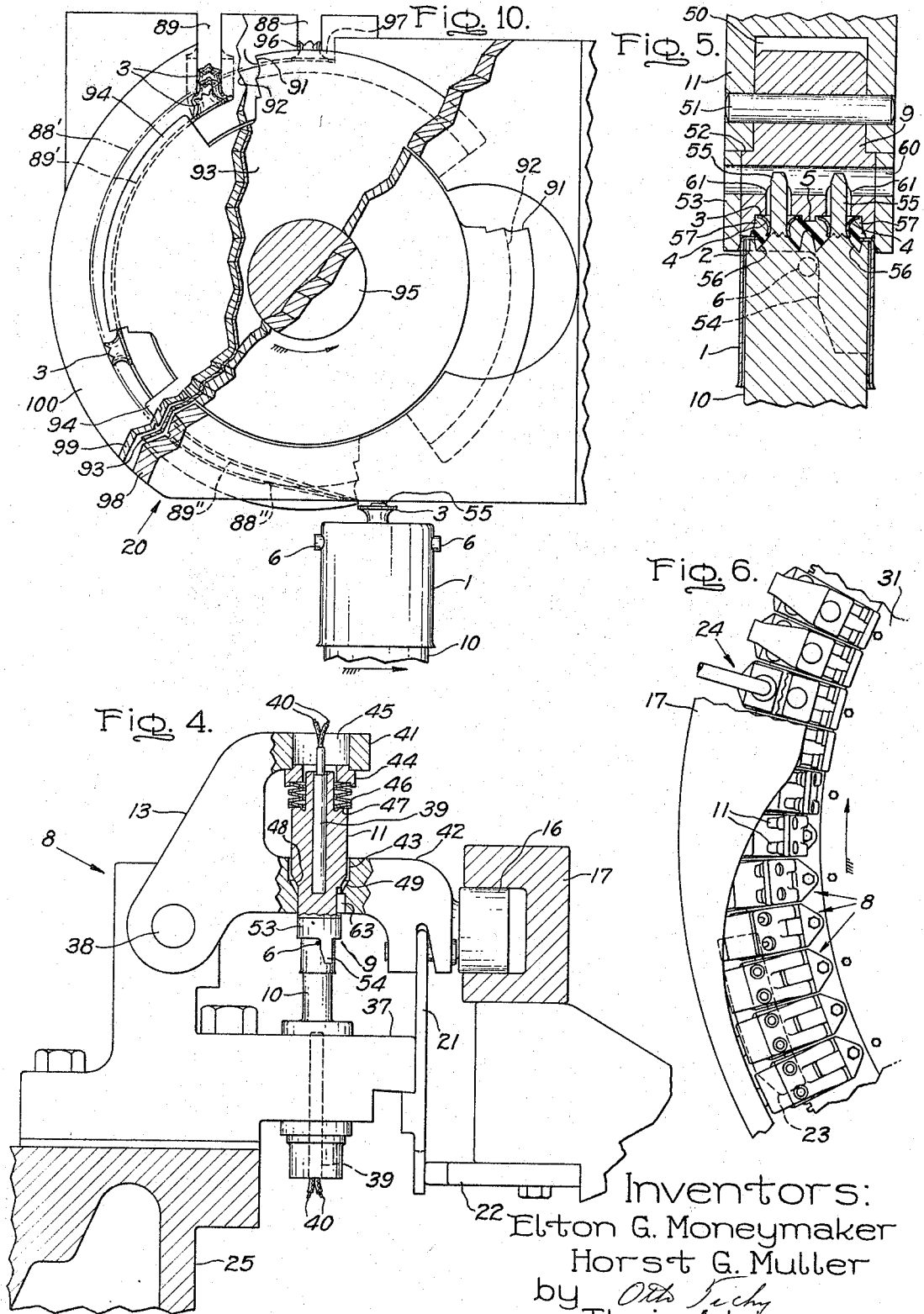

3,334,381
BASE-MAKING MACHINE
Elton G. Moneymaker, Willoughby, and Horst G. Muller, Cleveland, Ohio, assignors to General Electric Company, a corporation of New York
Filed Oct. 23, 1964, Ser. No. 405,907
1 Claim. (Cl. 18—5)

ABSTRACT OF THE DISCLOSURE

A high speed bayonet base-making machine on which the base components are assembled with the base shell positioned flange end up to facilitate feeding of the base parts and removal of the completed base. A continuously rotatable turret supports a series of heads having upstanding dies fitting into the base shell and pivoted dies for molding an organic plastic web uniting the eyelet contacts and the flange of the base shell.

The present invention relates to machines for making bases of the type useful for electrical devices and including a metal shell and at least one metal eyelet united and electrically insulated from each other by a molded web of organic plastic electrically insulating material.

A type of base in extensive use for miniature incandescent lamps, for example, comprises a cylindrical metal shell having an inturned annular flange at one end and provided with means for locking the base in a socket, such as a pair of pins projecting radially outward from the shell for engaging notches at the bottom of slots in a socket into which the base is to be inserted. A base of this type also includes one or more metal eyelet contacts secured to the flanged end of the shell by a molded button or web of organic plastic electrically insulating material. With this type of base the shell itself may or may not be used as a contact for the base and where the shell is not so used it is necessary to provide at the flanged end of the shell at least two eyelet contacts to which the current inlead wires for a filament of an incandescent lamp may be soldered.

The principal object of the present invention is to provide an improved machine for making bases of the above and similar types.

Further objects and advantages of the invention will appear from the following detailed description of an embodiment thereof.

Heretofore in making bases of the above and similar types, the component parts thereof, that is, the shell, the eyelet contact and the molding material, which may be in the form of a preform, has been assembled in a mold having a molding cavity suitably shaped for supporting the shell in flanged end down position, the eyelet contact in proper position with respect to the flanged end of the shell and also for shaping the exterior surface of the web of plastic molding material.

With the base components so assembled in the mold, a die plunger more commonly referred to as a force in this art, has been moved downwardly relative to the mold and through the shell to press the molding material into the mold cavity thus uniting the component parts of the base. The force shaped the interior surface of the molded web.

This manner of making bases is disclosed in the Szafran et al. U.S. Patent No. 2,716,742, patented Aug. 30, 1955 and assigned to the assignee of the present application. The Landgraf U.S. Patent No. 2,700,143, patented Jan. 18, 1955 also assigned to the assignee of the present application, describes a similar manner for making electric lamp bases of the threaded shell type having a single eyelet contact and a molded web of thermosetting organic plastic molding material uniting the shell contact and the eyelet contact. As described in the latter patent, the force must fit the inner surface of the shell adjacent the end thereof whereat the insulating web is formed in order to prevent the escape of molding material as the material is compressed into the form of the web on downward movement of the force so that all the molding material is available for the formation of the web in which the inturned flange of the shell and the eyelet contact are embedded.

In view of the necessity for a fit between the inner surface of the shell contact and the force and in view also of the necessity for the force to traverse practically the entire depth or length of the shell in molding the insulating web, the force could only be moved in a longitudinal direction with respect to the axis of the shell. Thus, it has been the practice in the art to mount the shell flanged end down and partially within the mold cavity, to place the eyelet in the bottom of the mold cavity and to form the web of the base at the bottom of the shell and around the eyelet supported in this position.

A feature of the improved base-making machine of the present invention is a molding head including a main support member having affixed thereto an upstanding postlike die adapted to support the components of the base in proper assembled relationship and to fit the inner surface of the cylindrical wall of a base shell placed on its upper end in a flanged end up position. The molding head also includes a cooperating die hinged on the support member for movement into and out of molding position with respect to the upper end of the post-like die. In the closed position of the molding head both dies firmly engage the annular flange on the base shell at the part of the flange adjoining the cylindrical wall of the shell. The fit between the post-like die and the cylindrical wall of the shell and the firm engagement of the dies with the flange on the shell during molding prevents the escape of molding material from the molding cavities as the material is compressed by the dies.

The upper end of the post-like die is provided with a pair of integral upwardly extending, spaced apart parallel pins which accommodate therebetween a preform of thermosetting organic plastic molding material. The pins also accommodate eyelet contacts which are slipped over the pins during the operation of the base-making machine as described hereinafter. The surface of the post-like die is provided with molding cavities at the base of the pins as well as cavities opening at the top of the die and extending longitudinally a substantial distance on diametrically opposite sides of the die. These cavities in the post-like die, hereinafter called the lower die, shape the interior surface of the molded organic plastic web of the completed base.

The hingedly mounted die, which is designated as the upper die hereinafter, is provided with passages for accommodating the pins projecting upwardly from the lower die and a cavity of suitable shape for forming the outer surface of the molded organic plastic web.

While the component parts of the base are being assembled in proper relationship on the lower die as described hereinafter, the upper die is in a die open position to give access to the lower die. With the base components assembled on the lower die, the upper die is swung into molding position in which position the organic molding material of the preform is heated and compressed between the dies to form the web of the base uniting the eyelet contacts and the shell. After the web has been molded and has solidified the upper die is swung from its molding to its die open position to give access to the lower die for removal of the completed base and assembling thereon of the components of another base.

In comparison with prior base-making machines used commercially heretofore wherein the lower die has been in the form of a mold having a cavity accommodating the assembled components of the base and shaping the exterior surface of the molded web and wherein the upper die has been in the form of a plunger or force mounted for reciprocation longitudinally and traversing the length of the shell to mold the web at the bottom of the base in the mold, the machine of the present invention facilitates proper and quick assembly of the base components by providing freer access to the part of the lower die on which the components are assembled, reduces the number of elements required by eliminating the need for ejection pins and the actuating means for the pin necessary with prior base-making molds, and, by hingedly mounting the upper die, reduces wear by reducing the travel of movable parts.

Also in comparison with prior base-making machines wherein the molds are mounted on a turret given a step by step movement with a dwell between each movement for the introduction of the base components into the mold and for the shaping of the web with the turret at dwell, the molding heads of the machine embodying the present invention are mounted on a turret given a continuous rotating movement about a horizontal axis for operation of the machine at high speeds.

In the drawings accompanying and forming part of this specification an embodiment of the invention is shown in which:

FIG. 1 is a plan view of a fragment of a base-making machine including a turret carrying a plurality of duplex molding heads and showing also a fragment of suitable feeders for the preform of molding material, the shell and the eyelet contacts of the base;

FIG. 2 is a partly sectional view in perspective of a bayonet lamp base made by the machine shown in FIG. 1;

FIG. 3 is an enlarged vertical section taken through a peripheral portion of the turret of the machine shown in FIG. 1, showing in full one of the heads in open position, showing partly in full and partly in phantom means for opening and closing the head and showing also in phantom the main drive for the turret;

FIG. 4 is a view similar to FIG. 3 showing the head in closed and locked position and with an upper die support shown partly in section;

FIG. 5 is an enlarged vertical section of the completed base and the upper and lower dies in molding position;

FIG. 6 is a fragmentary plan view similar to FIG. 1 showing the part of the machine whereat the completed bases are removed;

FIG. 7 is a perspective, partly sectional view on an enlarged scale showing part of a preform feeder for placing the preform of molding material on the lower die, the preform and the upper part of the lower die being shown in perspective;

FIG. 8 is a front elevational view on an enlarged scale of part of the feeder for placing the base shell over the upper end of the lower die member and also over the preform placed thereon by the apparatus shown in FIG. 7;

FIG. 9 is a side elevation view on an enlarged scale of the shell feeder part shown in FIG. 8 and showing in vertical section the lower die with the preform and the base shell thereon; and FIG. 10 is a side elevational view on an enlarged scale of part of an eyelet contact feeder adapted to place the eyelets on the pins of the lower die, parts thereof being broken to show the internal structure.

*General description*

The base shown in FIGS. 2 and 5, made by the machine shown in FIGS. 1 and 3 to 10, is of the bayonet type and comprises a metal shell 1 having an inturned annular flange 2 at one end, two metal eyelet contacts 3 and 4 and a molded web 5 of electrically insulating, thermosetting organic plastic material embedding each of the eyelets 3 and 4 and the flange 2. The base also includes a pair of radially projecting locking pins 6 affixed to the shell in diammetrically opposite positions at right angles to the common line of the contacts 3 and 4. The material of the web 5 embeds the inner ends of the pins 6.

Referring to FIGS. 1 and 3 to 6 of the drawings, the base-making machine is mounted on a support platform 7 and comprises a plurality of duplex heads 8, each comprising two pairs of dies with each pair including an upper die 9 and a lower die 10. The upper die 9 is affixed to a die stock 11. The heads 8 which are seventy in number, are mounted on a turret 12 in such manner that the hinged arm 13 (FIGS. 1, 3 and 4) carrying the upper die 9 of each pair is swung inwardly of the turret when moved from a die closed into a die open position to provide free access to the lower die 10 of each pair for facilitating assembly thereon of the base components. The turret 12 is rotated continuously in the direction of the arrow shown in FIG. 1 by the spur gear 14 engaging the ring gear 15 affixed to the turret. As the turret is rotated the cam follower 16 mounted on the arm 13 travels along the stationary cam track 17 mounted on the support 7 separately from and etxending along the periphery of the turret. The cam track 17 is so shaped as to cause opening and closing of the dies as the cam follower 16 is moved therealong on rotation of the turret.

While the components of the base shown in FIG. 2 may be assembled by hand on the lower die 10 and the completed base also may be removed from the lower die by hand, preferably automatic feeders for the base components are included together with automatic base take-out means to facilitate the high speed continuous operation of which the machine is capable.

In the drawings, a feeder 18 (FIGS. 1 and 7) for the preform 5' of molding material for the web 5, a shell feeder 19 (FIGS. 1, 8 and 9) and an eyelet feeder 20 (FIGS. 1 and 10) suitable for use in placing these components of the base on each of the lower dies 10 in sequence as the heads 8 are carried continuously past the feeders in die open position are shown and are described later herein.

After the base components have been assembled on the lower dies 10 the upper dies 9 are moved into a closed or molding position, shown in FIGS. 4 and 5, as the continuously rotating turret carries the cam follower 16 along the cam track 17 to swing the hinged arms 13 outwardly of the turret. Each head 8 includes a latching member 21 mounted on arm 13 which, as it is brought into engagement with the stationary cam 22 mounted on support 7 separately from the turret and extending along the periphery of the turret, locks the arm 13 in the position shown in FIG. 4 after the arm has been moved to a die closed position. On completion of the molding of the web of the base the latch 21 is released as it is moved along the stationary cam 23 (FIG. 6) also mounted separately from and along the periphery of the turret. Thereafter the upper dies 9 are moved from a molding to an open position shown in FIG. 3 and as described above for removal of the completed bases from the lower dies 10. The completed bases are taken off the lower dies preferably by a suction device 24 (FIG. 6) which deposits the completed bases in a receptacle (not shown).

*Detailed structure*

The turret 12 (FIGS. 1 and 3) comprises a ring-shaped support member 25 mounted on a ball bearing including a stationary race 26 affixed to the frame 7, a rotatable race 27 to which the member 25 is secured and the bearing balls 28 between the races 26 and 27. Glands 29 are provided between the races 26 and 27 to retain the lubricating material. A circular dust cover plate 31 is bolted to spaced apart bosses 32 on the support member 25. A series of hold down members 33 each including a post 34 affixed to the frame 7 and a roller 35 mounted on the post engages the lower flange 36 on the member 25.

Each head 8 (FIGS. 3 and 4) includes a body member 37 bolted to the support member 25. The arm 13 is hinged on member 37 as shown at 38 and the lower die 10 of each pair is affixed to member 37, as shown in FIGS. 3 and 4. A cartridge type electric heating unit 39, such as those used for household electric stoves, is provided for each of the dies 9 and 10. One of the heating units extends inwardly longitudinally of the portion of the lower die 10 engaging the body member 37 and the other of the heating units extends inwardly longitudinally of the stock 11 for the upper die 9. A pair of electrical insulated electrical conductors 40 is provided for each of the heating units 39.

The die stock 11 is supported between the legs 41 and 42 of the loop or U-shaped part of the arm 13 (FIG. 4) and makes a sliding fit with the wall of opening 43 through the leg 42. The upper end of the die stock 11 also makes a sliding fit with the bushing 44 set in the opening 45 of the leg 41. A plurality of spring washers 46 is provided between the bushing 44 and the shoulder 47 on the die stock 11 which tend to bias shoulder 48 on the die stock 11 toward the stop 49 in the leg 42.

The upper die 9 fits into a cavity 50 (FIG. 5) in the free end of the die stock 11 and is held firmly on the die stock by cross pin 51 with the shoulder 52 of the die 9 against the end of the die stock 11. The die 9 is provided with a centering skirt 53 which projects forwardly and overlaps part of die 10 and the flanged end of the base shell 1 in the completely closed position of the upper and lower dies 9 and 10 as shown in FIG. 5 to assure accurate seating of the upper die 9. A pair of fingers 54 project forwardly from the skirt 53 and engage the shell 1 and both the bayonet pins 6 thereon to properly position the shell on the lower die 10 as the upper die 9 is brought into molding position.

In the closed position of the head 8 the cavity defining surfaces of the die 9 and the die 10 mold the web 5 of organic plastic insulating material into the shape shown in FIGS. 2 and 5.

As shown in FIGS. 5, 7 and 9, the die 10 is provided with a pair of upwardly extending spaced apart parallel integral pins 55. The surface of the die 10 is provided with funnel forming cavities 56 extending around the base of the pins 55 as shown in FIGS. 5 and 7. The die 9 is provided with two passages accommodating the pins 55 as shown in FIG. 5 and also is provided with annular cavities 57 around each of the pin accommodating passages which, with the corresponding cavities in the die 10, form the part of the web which embeds the eyelets and the inner edge of the flange 2 as shown in FIG. 5 of the drawings.

The lower die 10 is also provided with a pair of cavities 58, one of which is shown in FIG. 7 of the drawings, which extend longitudinally a substantial distance on diametrically opposite sides of the die 10 to form the extensions on the web 5 covering the inner ends of the locking pins 6 affixed to the base shell as shown in FIG. 2 of the drawings. The upper die 9 is vented as shown in FIG. 5 by the cross passage 60 communicating with the pin accommodating passages 61.

In their molding positions the dies 9 and 10 firmly engage the flange 2 on the base shell 1 only at the part of the flange 2 adjoining the cylindrical wall of the shell as shown in FIG. 5. This, together with the fit between the inner surface of the cylindrical wall of the shell and die 10 prevents the escape of the molding material. The inner peripheral portion of the flange 2 is embedded in the web 5 in the completed base. Also, the eyelets 3 and 4 are embedded in the web 5 with the outer surfaces thereof exposed. With the molding surfaces of the dies 9 and 10 so shaped the web 5 molded thereby unites the eyelet contacts and the shell 1 and provides funnel-shaped passages 62 (FIG. 2) leading into the space defined by the eyelets to facilitate threading of current in lead wires from the interior of the base to the outer surface of the eyelets for soldering or attachment of the inlead wires to the exposed metal outer surfaces of the eyelet contacts.

Operation

In the operation of the machine, as the turret 12 is continuously rotated with the die heaters 39 continuously energized, the preform 5' shown in FIGS. 7 and 9 is placed between the pins 55 by the feeder 18 (FIG. 7) and is heated by the lower die 10 while the shell 1 is placed over the preform and the lower die 10 by the feeder 19, shown in FIGS. 8 and 9, and while the eyelets are placed on the pins 56 as shown in FIG. 10 by the eyelet feeder 20. With the base components so assembled on the lower die 10 the arm 13 is swung from a die open to a die closing position as the cam follower 16 is moved along the cam track 17. As the upper die 9 approaches its die closed position, it forces the eyelets 3 downwardly on the pins 55 from the position shown in FIG. 10 toward the position shown in FIG. 5 while additionally heating the preform 5'.

The full extent of the closing movement of the arm 13 does not occur immediately in the upper die 9 as the preform 5' is not at that time sufficiently heated to be plastic. Accordingly, the excess motion of the arm 13 effects a compression of the spring washers 46.

After an interval of heating during which the dies 9 and 10 travel further around the machine, the preform becomes sufficiently plastic to be molded by the pressure exerted thereon by the compressed spring washers 46 and the upper die 9 then is forced downwardly into the position shown in FIG. 5. Although not dependent on the downward movement of the upper die 9, the arm 13 is locked in its downward position by engagement of the latch 21 with the member 37 under the pressure of the cam 22 (FIGS. 1 and 4). A slight variation in the cam 17 then allows the arm 13 to move up until the latch 21 seats firmly against member 37, a position it holds because of the continuing pressure exerted by the washers 46.

A keyway 63 (FIG. 4) is provided in the stock 11 and the arm 42 to prevent accidental rotational movement of the stock 11 and to assure proper positioning of the base pins 6 with respect to the eyelets 3 on the base and entrance of the pins 55 on the die 10 into the passage 61 of the die 9 as the latter is moved into its closed position.

On completion of the molding and curing of the thermosetting plastic material of the web 5 under the heat and pressure simultaneously applied thereto by the dies 9 and 10, the head 8 is carried past the stationary cam 23 which releases the latch 21 to unlock the die assembly. Thereafter the arm 13 is swung from a die closing to a die opening position by the cam follower 16 following the cam track 17 which gives access to the base supported on the die 10. As pointed out above, the base may be removed by hand from the die 10 but preferably automatic means such as the suction tube 24 is employed for this purpose. When desired, a conventional vibratory means to loosen the shell of the base from the die 10 also may be employed for facilitating removal of the base by the suction means 24.

Suitable thermosetting plastic materials for forming the web 5 are phenol, urea and melamine formaldehydes and alkyd type plastics. Plastics of this type may be formed under heat and pressure simultaneously applied and a permanent condensation or polymerization occurs such that the shape of the molded body cannot be modified by subsequent applications of heat or pressure. In the case of a phenol formaldehyde plastic a die temperature of approximately 350° F. and a molding pressure in the range of a few thousand pounds per square inch is effective for forming the preform 5' into the shape of the web 5. The preform 5' consists of a predetermined quantity of such material compacted together into the shape shown in FIG. 7 of the drawings.

The preform feeder 18, part only of which is shown in FIGS. 1 and 7, is disclosed and claimed in copending application Ser. No. (LD 4541), filed of even date herewith, in which one of the present applicants, Horst G.

Muller, is named as sole inventor. The feeder does not form part of the present invention but is shown and described herein as illustrative of a type of feeder useful in connection with the base-making machine described above.

In brief, the feeder 18, as best shown in FIG. 7, includes preform transporting means in the form of a continuously rotatable member 64 which has a peripheral portion shaped so as to form a plurality of preform receiving sockets 63 in conjunction with a stationary frame member 65 around the member 64. The frame member 65 extends beneath the peripheral portion of the rotatable member 64 and supports the preforms 5′ until the latter are carried into position to pass downwardly through an opening 66 in the frame 65. The opening 66 is directly above the path of travel of the dies 10 and each of the preforms 5′ as it is brought into position above a travelling die 10 is pushed downwardly onto the die. The position of the preform after it has been transferred from the feeder to the die is shown in FIG. 7.

The transfer mechanism of the feeder includes a plunger 67 arranged to engage the preform 5′ and push it downwardly onto the die 10 against the retaining action of means spring-biased against the preform as the latter is moved into position over the opening 66. The preform retaining means is described later herein.

The plunger 67 of the transfer mechanism is supported by the pin 68 affixed to its upper end, the lever arm 69 providing a slot accommodating the pin 68 and the block 70 on which the lever 69 seats in its normal position. The lever 69 is held down on the block 70 by the spring 71. The block 70 is supported and given a circular motion in a vertical plane by a pair of pins passing through the block 70 and affixed in corresponding eccentric position on a pair of rotatable spindles. In FIG. 7 one of the pins is shown at 72 and one of the spindles at 73, the other pin and spindle being at the part of the feeder not shown in the drawings. As the spindles are rotated in a counter-clockwise direction, the lower end of the plunger is rotated in the same direction to engage and push the preforms downwardly in sequence onto the dies 10 as the preforms are brought above the opening 66 and the dies are brought into the opening with the preforms and the dies being carried in the direction of the arrows. A channel (not shown) is provided in frame 65 for passage of the pins 55 of dies 10. Actuating and timing means (not shown) are provided for correlating the operation of the above-described parts in proper sequence to obtain the desired feeding of the preforms 5′ to the base-making machine.

The feeding of the preforms may be interrupted, when desired, without stopping the base-making machine or the feeder mechanism simply by raising the plunger supporting end of the lever 69 with respect to the supporting block 70. This lifts the plunger 67 and prevents it from engaging the preforms 5′. A wedge placed between the lever 69 and the block 70 or a suitable electromechanical means, such as that disclosed and claimed in the copending application, may be used for this purpose.

The means for retaining the preforms in the feeder until pushed by the plunger 67 through the opening 66 includes the friction shoe 74 which is biased toward opening 66 by spring 75 mounted in the part 76 of the stationary frame 65. The shoe extends along the opening in position to engage the preforms and press them against the member 64 as the preforms are brought above the opening 66. The force exerted on the preforms by the retaining means is sufficient to prevent them falling thorugh the opening under gravitational forces. When the plunger has been lifted to discontinue the feeding of the preforms as described above, the preforms prevented from falling through the opening 66 by the retaining means are carried beyond the opening by member 64 until the plunger is returned to its operating position. A circular cover 64′ is provided for member 64 and a rotatable member 64″ is provided beneath the member 64 to support and move the preform 5′ along guideways (not shown) in member 64.

The shell feeder 19 shown in part in FIGS. 1, 8 and 9 of the drawings delivers the base shells 1 in sequence directly over the path of the dies 10 and places a shell on each of the dies as the latter are carried continuously past the feeder. The part of the feeder not shown supplies the base shells flange end up to the parts of the feeder shown at 19 and is disclosed and claimed in the Smith et al. U.S. Patent No. 2,892,567, patented June 30, 1959.

The shell feeder 19 includes the rotatable disc 77 (FIGS. 8 and 9) which has on its periphery a plurality of spaced notches 78 for accommodating the shells and the stationary support disc 79 which extends beneath the notches 78 and has an upstanding rim (not shown) on its periphery to maintain the shells in the notches 78 as the disc 78 is rotated. The stationary disc 79 has an opening 81 above the path of the dies 10 through which the shells 1 are moved downwardly onto the dies. The star wheel 82 is mounted above the opening 81 and as the wheel is rotated, the legs thereon engage and force the shells out of the notches 78, through the opening 81 and onto the dies 10 as the shells are moved over the opening 81 and the dies are carried beneath the opening in timed sequence.

The shells are retained in the notches while over the opening 81 and before the legs of the star wheel engage them by a friction shoe 83 which is spring-biased against the shells at this point. The friction shoe also causes the engaged shell to rotate in the notch until one of the pins 6 on the shell engages a vertical edge 80 of the upper part of the notch 78 so as to properly orient the shell on the die with the pins 6 included in a vertical plane normal to the vertical plane of the die pins 55. A groove 84 is provided in the lower part of the notch for the passage and guidance of the said pin 6 as the shell is forced downwardly as described above. In FIG. 9 the edge 80 and the groove 84 are shown slightly out of position for simplicity of illustration.

The friction shoe is mounted upon a pivot pin 85 affixed to a stationary frame 86 and is biased toward the notched disc 77 by the coiled spring 87 fastened to posts of the frame 86 and the pivotally mounted shoe.

The feeder for the eyelet contacts, with the exception of the transfer mechanism, is of the type disclosed and claimed in U.S. Patent No. 1,536,740, patented May 5, 1925. The feeder of this patent includes a plurality of receptacles for holding a supply of eyelet contacts, discharge passages communicating with the receptacles and a mechanism disposed between the delivery ends of the discharge passages and a stationary position assumed by a mold of a conventional base-making machine for transferring the contacts from the passages to the mold position.

In FIGS. 1 and 10 of the drawings the delivery ends of the discharge passages of a contact feeder of the above type are shown at 88 and 89 and a transfer mechanism suitable for carrying the eyelet contacts 3 from the delivery ends of the discharge passages, turning the contacts end-for-end and threading the contacts onto the pins 55 of the continuously moving dies 10 is shown at 20.

Referring to FIG. 10 of the drawings, the transfer mechanism 20 provides two arcuate channels 88′ and 89′ communicating with the guideways 88 and 89, respectively. The channels 88′ and 89′ are beneath openings at the delivery ends of the passages through which openings the eyelets drop one-by-one into the upper end of the channels 88′ and 89′. Each channel is defined by spaced apart stationary plates and terminates in a downwardly sloping portion 88″ and 89″ which ends directly above the path followed by a pin 55 on the die 10. As the eyelet contact 3 approaches the end of the sloping portion of the channel, the pin 55 threads into the opening in the eyelet and the eyelet then is carried by the die 10 in the position shown in FIG. 10.

The eyelet contacts in the channels 88' and 89' are engaged by teeth 91 and 92, respectively, on the peripheral portion of discs 93 and 94 affixed to the common shaft 95. As the shaft 95 is rotated continuously in the direction of the arrow the discs 93 and 94 allow a single eyelet at a time to fall into each of the channels 88' and 89' and propel the eyelet contacts 3 along the channels 88' and 89' for delivery to the pins 55.

Each of the guideways 88 and 89 and the channels 88' and 89' are shaped to maintain the eyelet contacts with their shank end 96 and their flared end 97 in the relative positions shown in FIG. 10. The space between the teeth on the discs 93 and 94 is limited to that sufficient to accommodate a single eyelet. The stationary spaced apart plates defining the arcuate channels 88' and 89' and the sloping portions 88" and 89" are shown at 98, 99 and 100. The shaft 95 is driven at a speed effective for providing a pair of eyelet contacts on the pins 55 of each die 10 of the base-making machine during operation.

While a species of the invention has been shown and described it will be understood that changes in the form and details of the machine may be made by those skilled in the art without departing from the spirit and scope of the invention as defined in the appended claim.

What we claim as new and desire to secure by Letters Patent of the United States is:

A molding head for a machine for making unitary bases including a cylindrical metal shell having an annular inturned flange at one end, a pair of locking pins projecting radially outward in opposite directions from the shell and terminating within the shell, a pair of eyelet contacts in a line normal to the direction of the locking pins and a web of organic plastic electrically insulating material uniting the eyelet contacts and the flanged end of the shell and embedding the interior ends of the locking pins, said head comprising a base shell receiving die having a base shell interior fitting upstanding cylindrical portion, a shell flange engaging and molding material receiving molding surface at the top of said portion and eyelet contact receiving integral pins extending upwardly from said surface, said head comprising also a cooperating die pivoted on said head for movement between die open and die closed positions and having die pin receiving openings, a shell flange and eyelet contact engaging molding surface and a shell engaging skirt extending around the molding surface and provided with forwardly extending locking pin engaging fingers for orienting the locking pins with respect to the eyelet contact receiving die pins, the molding surfaces of said dies in die closed position defining a cavity of the shape of the web uniting the eyelet contacts and the flanged end of the shell, the molding surface at the top of the cylindrical die portion extending longitudinally of said portion a sufficient distance to define with the inner cylindrical surface of a received base shell cavity portions of the shape of the web portions embedding the interior ends of the base locking pins.

References Cited

UNITED STATES PATENTS

| | | | |
|---|---|---|---|
| 1,492,510 | 4/1924 | DeEscobules | 18—20 |
| 1,846,999 | 2/1932 | Eaton | 18—20 |
| 1,965,732 | 7/1934 | Bisterfeld | 18—20 |
| 2,045,705 | 6/1936 | Finn | 18—20 X |
| 2,055,742 | 9/1936 | Burke | 18—20 |
| 2,440,367 | 4/1948 | Cropp | 18—20 |
| 2,504,751 | 4/1950 | Studli | 18—20 |
| 2,634,522 | 4/1953 | Leef | 18—20 X |
| 2,716,742 | 8/1955 | Szafran et al. | |
| 2,745,135 | 5/1956 | Gora | 18—20 X |
| 2,748,424 | 6/1956 | Fay | 18—20 |
| 2,823,419 | 2/1958 | Winters et al. | 18—20 |
| 2,850,072 | 9/1958 | Bryans | 18—20 X |
| 2,903,041 | 9/1958 | Jones et al. | 18—20 X |
| 2,928,126 | 3/1960 | Heller | 18—36 |
| 2,982,999 | 5/1961 | Stewart | 18—36 X |
| 2,995,782 | 8/1961 | Heller | 18—36 X |
| 3,015,132 | 1/1962 | Bunting | 18—20 X |
| 3,135,019 | 5/1964 | Aichele | 18—20 X |
| 3,238,567 | 3/1966 | Thomas | 18—36 X |
| 3,270,373 | 9/1966 | Jagger et al. | |

WILLIAM J. STEPHENSON, *Primary Examiner.*